United States Patent Office 3,491,864
Patented Jan. 27, 1970

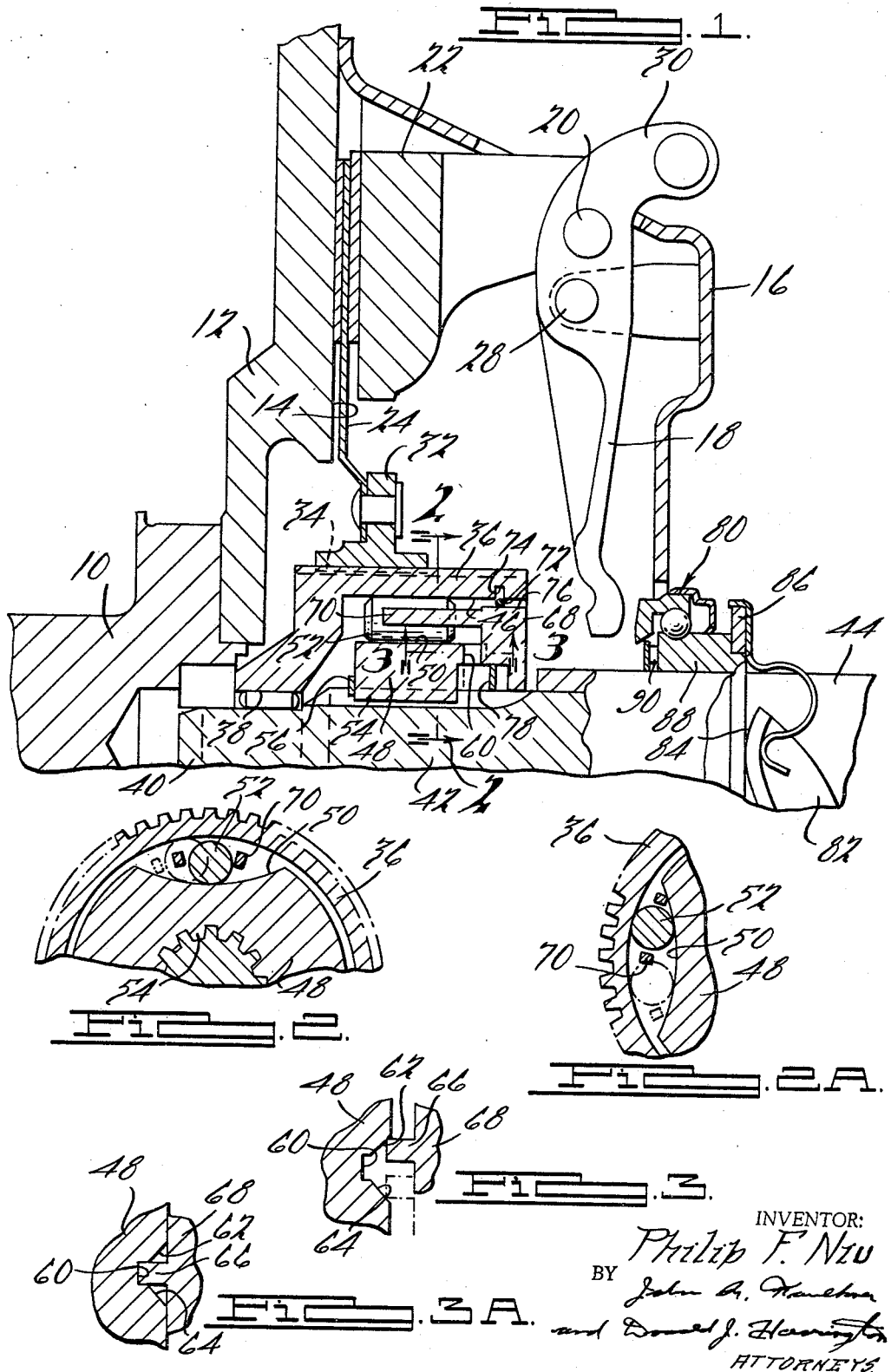

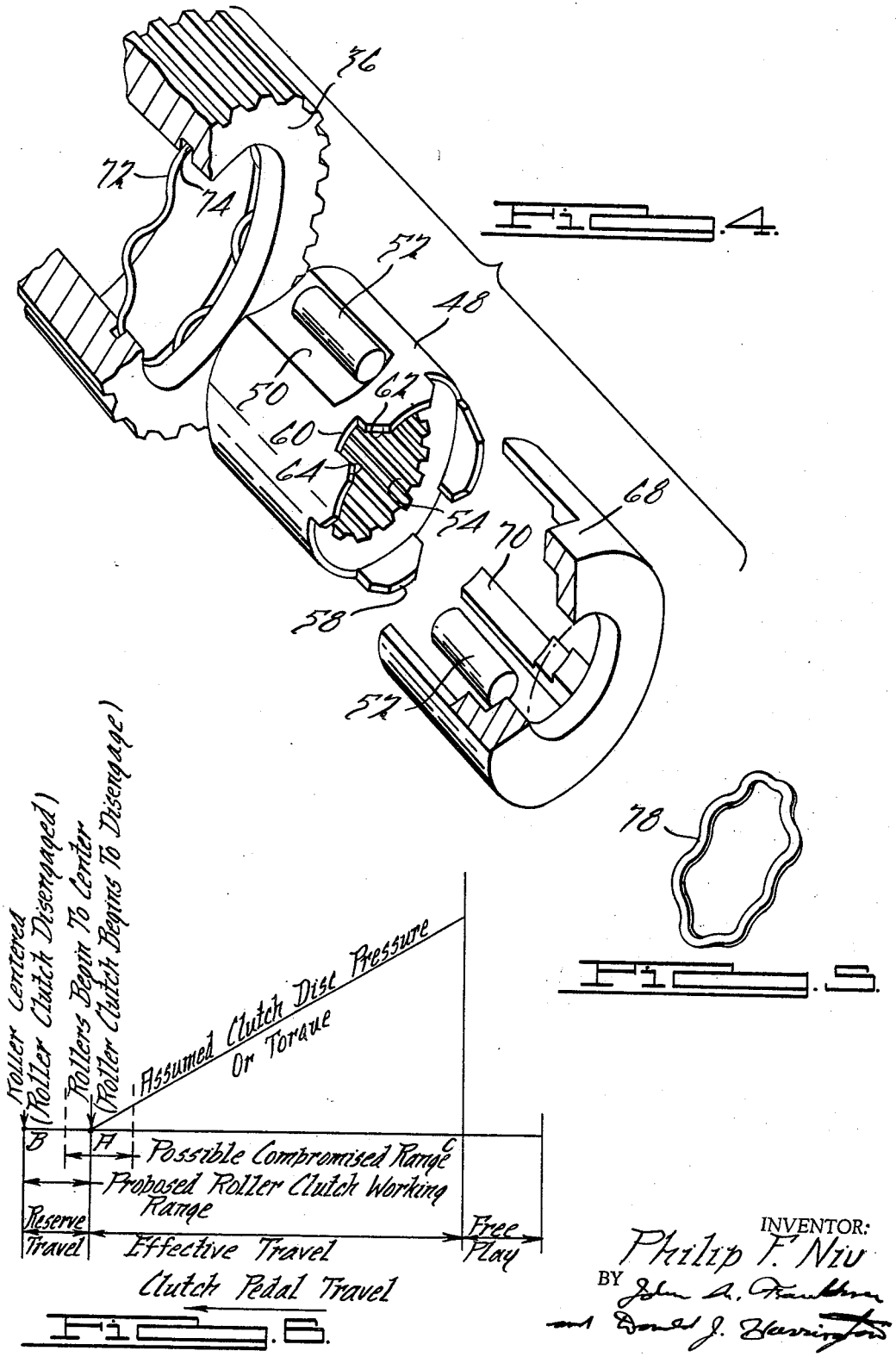

---

3,491,864
DISENGAGEABLE CLUTCH DISC COUPLING
Philip F. Niu, Ann Arbor, Mich., assignor to Ford Motor Company, Dearborn, Mich., a corporation of Delaware
Filed Dec. 12, 1967, Ser. No. 690,020
Int. Cl. F16d 21/08, 23/00
U.S. Cl. 192—48.3        5 Claims

ABSTRACT OF THE DISCLOSURE

A friction clutch for use in an automotive vehicle driveline. The clutch includes a vehicle engine driven flywheel, a friction disc clutch and a pressure plate. The hub of the friction disc is connected to the power input shaft of a multiple ratio power transmission through a disengageable clutch assembly which can be disengaged by a personally operable clutch control mechanism thereby disconnecting the inertia mass of the friction disc and the disc hub from the power input shaft of the transmission.

BRIEF SUMMARY OF THE INVENTION

My invention relates generally to automotive vehicle drivelines having an internal combustion engine and a multiple ratio power transmission mechanism through which torque is delivered to the vehicle traction wheels. The power input shaft for the transmission mechanism is connected to an engine driven flywheel through a selectively engageable neutral clutch.

It is usual practice in environments of this type to disengage the neutral clutch as the transmission mechanism is conditioned for a speed ratio change. The ratio changes are accomplished following disengagement of the neutral clutch by synchronizer clutch structure that connects together for rotation in unison the related torque delivery elements of the transmission mechanism. The synchronizing clutch structure can establish synchronism in the motion of the torque delivery elements prior to completion of the ratio change.

The energy that must be absorbed by the synchronizer clutches during the ratio change depends upon the inertia of the rotating mass. If the mass can be reduced to a minimum, the synchronizing effort of the synchronizer clutches can be reduced, thereby improving the quality of the ratio shift and reducing undesirable gear clashing and wear. The improvement of my invention comprises a disengageable clutch structure which disconnects the inertia mass of the clutch disc hub and the disc itself from the power input shaft for the transmission. This reduces the polar moment of inertia of the rotating mass during the shift interval since the synchronizer clutch structure is not required to accelerate or decelerate the neutral clutch disc and its hub.

The disengageable clutch for disconnecting the friction clutch disc is actuated by the same mechanical linkage mechanism that is used for disengaging the neutral clutch so that no additional control operation is required by the vehicle operator.

My invention comprises elements that are common to transmission neutral clutch constructions of known design. These include a clutch throwout bearing mounted on a relatively stationary clutch sleeve shaft. A clutch release lever carried by the engine flywheel housing is shifted to a clutch releasing position when it is engaged by the clutch throwout bearing and actuated to a clutch releasing position. As the clutch throwout bearing is moved beyond the position corresponding to the clutch release position, it engages clutch release elements of the disengageable clutch structure for the clutch disc hub. The provision of a clutch structure having these functions is an object of my invention.

It is another object of my invention to provide a disengageable clutch for selectively releasing the clutch disc hub from the power input shaft of the transmission mechanism upon overtravel of the linkage that is used for disengaging the neutral clutch disc from the engine flywheel, said disengageable clutch comprising releasable roller elements that are actuated to a clutch release position by a cam member enaged by the clutch throwout bearing as the latter is over-traveled.

BRIEF DESCRIPTION OF THE FIGURES OF THE DRAWING

FIGURE 1 shows in longitudinal cross sectional form an assembly view of my improved clutch structure.

FIGURE 2 is a cross sectional view taken along the plane of section line 2—2 of FIGURE 1.

FIGURE 2A shows a portion of the clutch structure of FIGURE 2 in a torque delivery condition.

FIGURE 3 shows in partial cross sectional form a portion of the releasable clutch structure of FIGURE 1.

FIGURE 3A shows the structure of FIGURE 3 in the clutch engaging position.

FIGURE 4 is an exploded assembly view of the clutch structure of FIGURE 1.

FIGURE 5 is a detailed view of the wave spring used in the structure of FIGURE 1; and FIGURE 6 is a chart showing the clutch engagement pattern upon movement of the clutch throwout bearing.

PARTICULAR DESCRIPTION OF THE INVENTION

In the drawings, numeral 10 designates one end of the crankshaft of an internal combustion engine. It is provided with a flange to which is bolted an engine flywheel 12, which forms a first clutch element. A clutch friction surface 14 is formed on one face of the flywheel. The flywheel carries a clutch housing 16 on which is pivotally mounted a clutch actuating lever 18, which forms part of a so-called second personally operable clutch release means mentioned later herein. The lever 18 is pinned at 20 to pressure plate 22. A clutch disc 24 is situated between the friction surface 14 of the flywheel 12 and the pressure plate 22.

When the lever 18 is oscillated in a counterclockwise direction about its pivot point, which is indicated at 28, it applies a pressure to the pressure plate 22, thereby engaging the friction disc 24.

The lever 18 includes a centrifugal mass 30 disposed in offset relationship with respect to the pivot point 28. Rotation of the flywheel 12 and the housing 16 therefore causes the lever 18 to move to a clutch applying position. Several such levers 18 are pivoted although only one is illustrated.

The friction disc 24 includes a hub 32 which is splined at 34 directly to the outer periphery of a roller clutch outer race 36. This race is formed with a central bearing opening 38 which receives a pilot extension 40 of a power input shaft 42 for a multiple ratio power transmission mechanism (not shown). The shaft 42 is journaled for rotation within a stationary throwout bearing support sleeve 44. This is connected directly to the relatively stationary transmission housing.

The roller clutch outer race 36 is formed with an internal clutch race 46. An inner clutch race 48 concentrically received within the race 36 is formed with a plurality of cam recesses 50, each of which receives a roller 52. Race 48 is splined at 54 to the power input shaft 42 for the transmission mechanism. The race 48 is held axially fast with respect to the shaft 42 by snap ring 56.

The inner race 48 is formed with a series of cam elements 58, as seen in FIGURE 4, which cooperate to define cam recesses 60 at circumferentially spaced locations. Each recess has a pair of cam surfaces 62 and 64. Recesses 60 are adapted to register with cam projections 66 formed on a control ring 68, which forms in part a so-called first personally operable clutch release means mentioned later herein. When the ring 68 is shifted in a left-hand direction to establish registry between the projection 66 and the recess 60, the ring 68 is shifted angularly with respect to the race 48. This is seen in FIGURES 3 and 3A.

Control ring 68 is formed with a plurality of control fingers 70, one finger 70 being received between each pair of rollers 52. When the control ring 68 is centered, the control fingers 70 move the rollers 52 to a central position as indicated best in FIGURE 2. This disengages the clutch to permit free relative rotation of the race 36 with respect to the race 48.

A drag spring 72 is received within an internal groove 74 formed in the inner race 36. The convolutions of the spring 72 frictionally engage the outer peripheral surface 76 of the control ring 68. When relative rotation occurs between control ring 68 and the race 36, the control ring 68 will tend to be shifted relative to the race 48. This will cause clutching engagement of the rollers 52. The drag spring 72 thus triggers the actuation of the clutch regardless of the direction of delivery of torque. The full line position for the rollers 52 shown in FIGURE 2A is assumed when torque is delivered in one direction. The dotted line position for the rollers 52 in FIGURE 2A is assumed when torque is delivered in the opposite direction. Freewheeling motion of the race 36 with respect to the race 48 is permitted when the rollers 52 assume the FIGURE 2 position as the control ring 68 is shifted.

A wave spring 78 is located between the race 48 and the control ring 68, tending normally to urge these two elements apart.

The clutch release lever 18 is adapted to be engaged by a throwout bearing 80. This bearing engages the inner end of the release levers 18 when it is shifted in a left-hand direction on the sleeve 44 by the vehicle operator. This is done by means of a clutch lever 82 which is pivoted on the relatively stationary transmission housing. The radially inward end 84 of the lever 82 engages one side 86 of the throwout bearing. The lever 82 and throwout bearing 80 form a common controlling member for the first and second personally operable clutch release means.

The throwout bearing includes a hub 88 which is adapted to engage the control ring 68. If desired, a suitable radial needle thrust bearing 90 can be interposed between the hub 88 and the ring 68.

In the chart of FIGURE 6, the abscissa is an indication of the displacement of the clutch throwout bearing hub. The right-hand end of the chart represents the degree of free play in the clutch operating linkage. In the region between point A and point C along the abscissa, the travel of the throwout bearing during clutch disengagement is from right to left.

When point A is reached by the clutch throwout bearing, the hub 88 engages the control ring 68. At this time the neutral clutch is fully disengaged. As the throwout bearing overtravels from point A to point B, the control ring 68 is shifted to cause the rollers to assume a disengaged position as indicated in FIGURE 2. This disengages the mass of the clutch disc and the clutch disc hub from the shaft 44. Thus, when ratio changes are accomplished in the power transmission mechanism, synchronization can be achieved without the necessity for compensating for the moment of inertia of the rotating mass of the clutch disc and the clutch disc hub.

When the clutch is engaged, the roller clutch assembly is capable of delivering torque under both driving and coast conditions. This is true because of the clutch engaging triggering action of the drag spring 72 which assures that the rollers will always be in either one driving position or the other depending upon the direction of torque delivery.

Having thus described a preferred form of my invention, what I claim and desire to secure by U.S. Letters Patent is:

1. In an automotive vehicle driveline having an engine crankshaft and a multiple ratio power transmission mechanism, said transmission mechanism comprising a power input shaft forming a part of a torque delivery shaft from said engine crankshaft to driven portions of said driveline, a neutral clutch structure for connecting and disconnecting said crankshaft and said power input shaft including a first clutch element connected drivably to said crankshaft, a friction disc adapted for rotation about the axis of said power input shaft, a clutch hub carrying said friction disc, a pressure plate situated adjacent said friction disc, means for applying a clutch engaging force to said pressure plate to cause said friction disc to become frictionally engaged with said engine driven clutch element, releasable clutch means for connecting said friction disc hub and said power input shaft to accommodate torque delivery between said engine and said power input shaft, said releasable clutch means including driving and driven elements with portions thereof situated in torque transmitting relationship, said driving and driven elements being connected respectively to said hub and to said input shaft, torque transmitting clutch elements between said hub and said input shaft, and personally operable means for shifting said clutch elements out of torque transmitting relationship with respect to said driving and driven elements to disestablish the driving connection between said friction disc and said power input shaft.

2. In an automotive vehicle driveline having an engine crankshaft and a multiple ratio power transmission mechanism, said transmission mechanism comprising a power input shaft forming a part of a torque delivery shaft from said engine crankshaft to driven portions of said driveline, a neutral clutch structure for connecting and disconnecting said crankshaft and said power input shaft including a first clutch element connected drivably to said crankshaft, a friction disc adapted for rotation about the axis of said power input shaft, a disc hub carrying said disc, a pressure plate situated adjacent said friction disc, means for applying a clutch engaging force to said pressure plate to cause said friction disc to become frictionally engaged with said engine driven clutch element, releasable clutch means for connecting said friction disc hub and said power input shaft to accommodate torque delivery between said engine and said power input shaft, said releasable clutch means including driving and driven elements connected respectively to said hub and said input shaft, torque transmitting clutch elements between said hub and said shaft, first personally operable clutch release means for shifting said clutch elements out of torque transmitting relationship with respect to said hub and said input shaft, second personally operable clutch release means for relieving pressure on said pressure plate on said friction disc thereby disconnecting the frictional connection between said friction disc and said engine, the first and second personally operable means including a common control member adapted to disengage said releasable clutch following disengagement of said pressure plate as clutch controlling motion of said control member continues beyond the position corresponding to disengagement of said friction disc.

3. In an automotive vehicle driveline having an engine crankshaft and a multiple ratio power transmission mechanism, said transmission mechanism comprising a power input shaft forming a part of a torque delivery shaft from said engine crankshaft to driven portions of said driveline, a neutral clutch structure for connecting and disconnecting said crankshaft and said power input shaft including a first clutch element connected drivably to said crankshaft, a friction disc adapted for rotation about the axis of said power input shaft, a pressure plate situated adjacent said friction disc, means for applying a clutch engaging force to said pressure plate to cause said friction disc to become frictionally engaged with said engine driven clutch element, releasable clutch means for connecting said friction disc and said power input shaft to accommodate torque delivery between said engine and said power input shaft, said releasable clutch means including driving and driven elements with portions thereof situated in torque transmitting relationship, personally operable means for disengaging said last named portions to disestablish the driving connection between said friction disc and said power input shaft, said releasable clutch means comprising an outer clutch race connected to said friction disc and journalled rotatably about the axis of said power input shaft, an inner race connected to said power input shaft, overrunning clutch elements disposed between said races, one of said races being cammed to establish recesses that receive said clutch elements, and personally operable cam means held rotatably fast on the other race and extending within the races to move said clutch elements from driving engagement with said races when it assumes one axial position.

4. An automotive vehicle driveline as set forth in claim 2 wherein said transmission mechanism comprises a power input shaft forming a part of a torque delivery shaft from said crankshaft to driven portions of said driveline, a neutral clutch structure for connecting and disconnecting said engine and said power input shaft including a first clutch element connected drivably to said crankshaft, a friction disc adapted for rotation about the axis of said power input shaft, a pressure plate situated adjacent said friction disc, means for applying a clutch engaging force to said pressure plate to cause said friction disc to become frictionally engaged with said engine driven clutch element, releasable clutch means for connecting said friction disc and said power input shaft to accommodate torque delivery between said engine and said power input shaft, said releasable clutch means including driving and driven elements with portions thereof situated in torque transmitting relationship, first personally operable means for disengaging said last named portions to disestablish the driving connection between said friction disc and said power input shaft, second personally operable clutch release means for relieving the pressure of said plate on said friction disc thereby disconnecting the frictional connection between said friction disc and said engine, the first and second personally operable means including a common control member adapted to disengage said releasable clutch following disengagement of said pressure plate as clutch controlling motion of said control member continues beyond the position corresponding to disengagement of said friction disc.

5. In an automotive vehicle driveline having an engine crankshaft and a multiple ratio power transmission mechanism, said transmission mechanism comprising a power input shaft forming a part of a torque delivery shaft from said engine crankshaft to driven portions of said driveline, a neutral clutch structure for connecting and disconnecting said crankshaft and said power input shaft including a first clutch element connected drivably to said crankshaft, a friction disc adapted for rotation about the axis of said power input shaft, a pressure plate situated adjacent said friction disc, means for applying a clutch engaging force to said pressure plate to cause said friction disc to become frictionally engaged with said engine driven clutch element, releasable clutch means for connecting said friction disc and said power input shaft to accommodate torque delivery between said engine and said power input shaft, said releasable clutch means including driving and driven elements with portions thereof situated in torque transmitting relationship, and personally operable means for disengaging said last named portions to disestablish the driving connection between said friction disc and said power input shaft, said releasable clutch means comprising a friction spring member carried by one race with a portion thereof frictionally engaging said cam means whereby the latter is shifted relative to said one race to effect clutching engagement of said clutch elements with said races when relative motion exists between said races.

References Cited

UNITED STATES PATENTS

| | | | |
|---|---|---|---|
| 1,957,500 | 5/1934 | Harris et al. | 192—48.3 |
| 2,137,977 | 11/1938 | Kattwinkel | 192—48.7 |
| 3,219,161 | 11/1965 | Villeple et al. | 192—48.5 |

MARK M. NEWMAN, Primary Examiner

A. D. HERRMANN, Assistant Examiner

U.S. Cl. X.R.

192—48.7, 35, 38